(12) United States Patent
Zhan

(10) Patent No.: US 11,321,204 B2
(45) Date of Patent: May 3, 2022

(54) COMPLEX PROGRAMMABLE LOGIC DEVICE AND OPERATION METHOD THEREOF

(71) Applicants: Inventec (Pudong) Technology Corporation, Shanghai (CN); INVENTEC CORPORATION, Taipei (TW)

(72) Inventor: Peng Zhan, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 442 days.

(21) Appl. No.: 16/565,823

(22) Filed: Sep. 10, 2019

(65) Prior Publication Data

US 2021/0064493 A1    Mar. 4, 2021

(30) Foreign Application Priority Data

Aug. 30, 2019    (CN) .......................... 201910814739.9

(51) Int. Cl.
*G06F 11/273*    (2006.01)
*G06F 11/22*    (2006.01)
*G06F 11/30*    (2006.01)
*G06F 13/38*    (2006.01)
*G06F 13/42*    (2006.01)

(52) U.S. Cl.
CPC ........ *G06F 11/273* (2013.01); *G06F 11/2221* (2013.01); *G06F 13/385* (2013.01); *G06F 13/4282* (2013.01); *G06F 11/3041* (2013.01); *G06F 2213/0016* (2013.01)

(58) Field of Classification Search
None
See application file for complete search history.

*Primary Examiner* — Farley Abad
*Assistant Examiner* — Dayton Lewis-Taylor
(74) *Attorney, Agent, or Firm* — Locke Lord LLP; Tim Tingkang Xia, Esq.

(57) ABSTRACT

A complex programmable logic device includes a SGPIO analyzing circuit, a I²C analyzing circuit and a first multiplexer. The SGPIO analyzing circuit has a plurality of port analyzing circuits, a detecting circuit and a processing circuit. Each port analyzing circuit receives an input signal and outputs a first data. The detecting circuit detects the input signal of the first port analyzing circuit to output a detecting signal. The processing circuit captures port information of the first data outputted by at least part of the port analyzing circuits as a first control signal according to the detecting signal. The I²C analyzing circuit analyzes a data flow for outputting a second control signal according to an address command related to an address message, a control command and an input data. The first multiplexer selects the first control signal or the second control to be outputted according to a testing signal.

8 Claims, 3 Drawing Sheets

COMPLEX PROGRAMMABLE LOGIC DEVICE AND OPERATION METHOD THEREOF

CROSS-REFERENCE TO RELATED APPLICATIONS

This non-provisional application claims priority under 35 U.S.C. § 119(a) on Patent Application No(s). 201910814739.9 filed in China on Aug. 30, 2019, the entire contents of which are hereby incorporated by reference.

BACKGROUND

1. Technical Field

This disclosure relates to a complex programmable logic device, more particularly to a complex programmable logic device using $I^2C$ analyzing modules and SGPIO analyzing modules.

2. Related Art

Nowadays, a complex programmable logic device (CPLD) of a hard disk drive (HHD) backplane is mainly responsible for performing LED lighting associated with HDDs, power on/off control for HDDs, timing control for NVME and HDD states reading. However, the configuration of the $I^2C$ modules and the SGPIO modules in the complex programmable logic device is quite complicated and not simplified. It results in the insufficient resources of the complex programmable logic device. A high-end complex programmable logic device is necessary if the backplane is required to support a variety of interfaces (e.g. SATA and NVME). However, it will inevitably result in an increasing cost.

Furthermore, different types of complex programmable logic devices are required for operating with different types of backplanes. It will result in a huge amount of versions of CPLDs and their firmware as well as high maintenance costs. Accordingly, it is necessary to develop a complex programmable logic device which is capable of integrating different types of backplanes and meeting functional requirements of the different types of backplanes.

SUMMARY

According to one embodiment of the present disclosure, a complex programmable logic device is disclosed. The complex programmable logic device comprises a SGPIO analyzing circuit, a $I^2C$ analyzing circuit and a first multiplexer. The SGPIO analyzing circuit comprises a plurality of port analyzing circuits, a detecting circuit and a processing circuit. Each of the plurality of port analyzing circuits has an input terminal and an output terminal, with the input terminal configured to receive a first input signal and the output terminal configured to output a piece of first data. The detecting circuit is electrically connected to the input terminal of a first port analyzing circuit among the plurality of port analyzing circuits and detects the first input signal received by the first port analyzing circuit for outputting a detecting signal. The processing circuit is electrically connected to the plurality of output terminals of the plurality of port analyzing circuits and the detecting circuit, and the processing circuit obtains port information included in each of the pieces of first data outputted by the output terminals of at least part of the plurality of port analyzing circuits according to the detecting signal for outputting a first control signal. The $I^2C$ analyzing circuit is configured to analyze a data flow for generating an address message, a control instruction and an input data, and the $I^2C$ analyzing circuit outputs a second control signal according to an address command associated with the address message, the control instruction and the input data. The first multiplexer is configured to selectively output the first control signal or the second control signal according to a test signal.

According to one embodiment of the present disclosure, an operation method of a complex programmable logic device is disclosed. The operation method includes steps of: receiving a first input signal and accordingly outputting a piece of first data by each of a plurality of port analyzing circuits; detecting the first input signal received by a first port analyzing circuit among the plurality of port analyzing circuits for outputting a detecting signal by a detecting circuit; obtaining port information of each of the pieces of first data outputted by at least part of the plurality of port analyzing circuits according to the detecting signal for outputting a first control signal by a processing circuit; analyzing a data flow for generating an address message, a control instruction and an input data and outputting a second control signal according to an address command associated with the address message, the control instruction and the input data by a $I^2C$ analyzing circuit; and selectively outputting the first control signal or the second control signal according to a testing signal by a first multiplexer.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
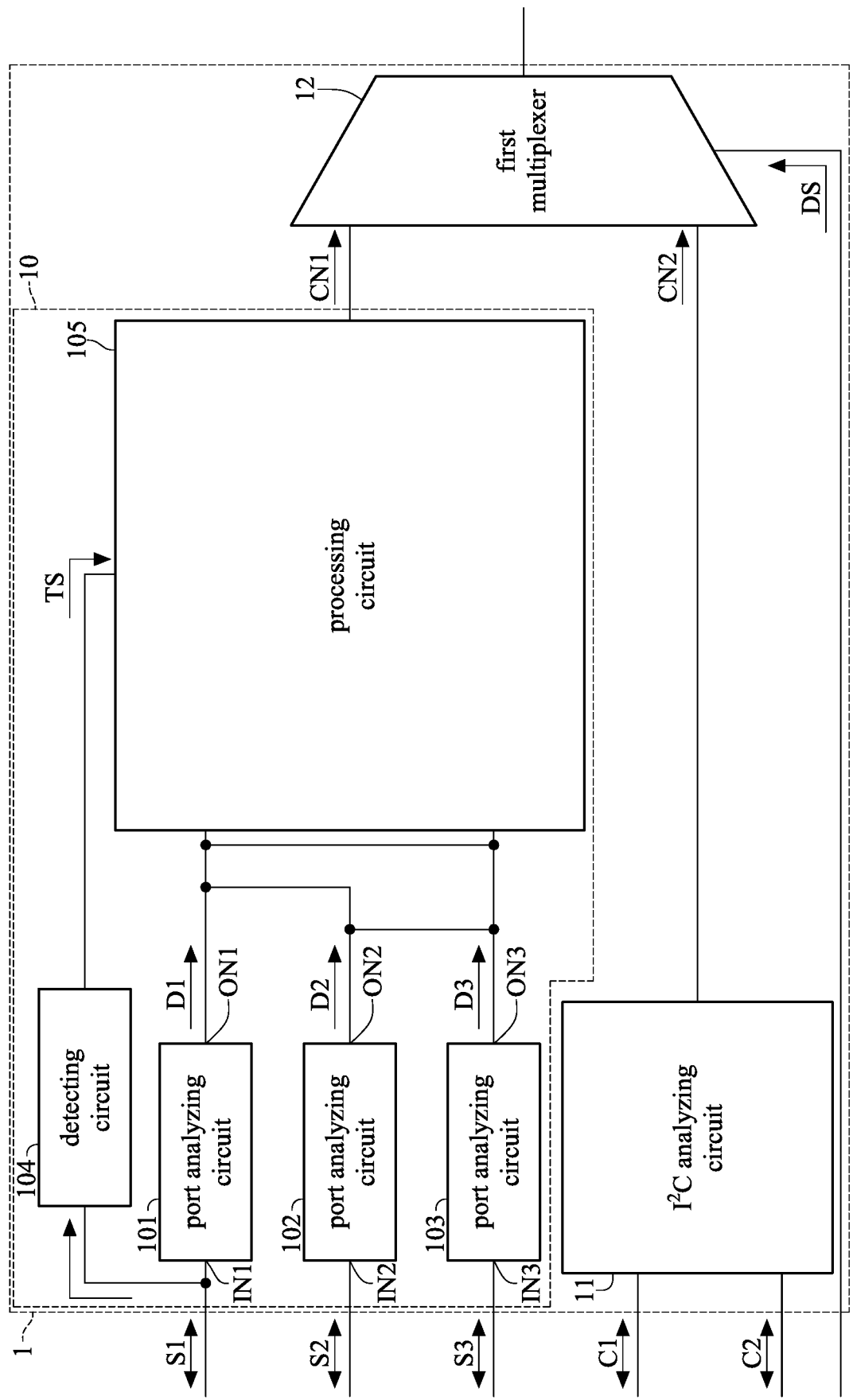
FIG. 1 is a block diagram of a complex programmable logic device according to one embodiment of the present disclosure.

Please refer to FIG. 1, which is a block diagram of a complex programmable logic device according to one embodiment of the present disclosure. As shown in FIG. 1, the complex programmable logic device 1 includes a Serial General Purpose Input/Output (SGPIO) analyzing circuit 10, an Inter-integrated circuit ($I^2C$) analyzing circuit 11 and a first multiplexer 12. The SGPIO analyzing circuit 10 includes a plurality of port analyzing circuits 101-103, a detecting circuit 104 and a processing circuit 105. Each of the port analyzing circuits has an input terminal and an output terminal, wherein the input terminal is configured to receive a first input signal and the output terminal is configured to output a piece of first data. In practice, the complex programmable logic device 1 can be disposed on a backplane (not shown in figures) and provides a variety of signal-analysis functions depending on interface types supported by the backplane for performing LED-lighting of hard disk drives.

As shown in the embodiment of FIG. 1, the port analyzing circuit 101 has an input terminal IN1 and an output terminal ON1, with the input terminal IN1 receiving a first input signal S1 and the output terminal ON1 outputting a piece of first data D1. The port analyzing circuit 102 has an input terminal IN2 and an output terminal ON2, with the input terminal IN2 receiving a first input signal S2 and the output terminal ON2 outputting a piece of first data D2. The port analyzing circuit 103 has an input terminal IN3 and an output terminal ON3, with the input terminal IN3 receiving a first input signal S3 and the output terminal ON3 outputting a piece of first data D3. In practice, each of the port analyzing circuits 101-103 can be connected to a platform controller hub (PCH) or a host bus adapter (HBA). Each of the first input signals S1-S3 can be a SGPIO signal from either a PCH or a HBA. The PCH corresponds to an 8-port signal while the HBA corresponds to a 4-port signal.

The detecting circuit 104 is electrically connected to the input terminal IN1 of the first port analyzing circuit (that is, the port analyzing circuit 101) among the port analyzing circuits 101-103, and the detecting circuit 104 detects the first input signal S1 received by the port analyzing circuit 101 for outputting a detecting signal TS. Specifically, the detecting circuit 104 is configured to determine the type (or the number of ports) of the first input signal S1 so as to generate a detecting result and output the detecting signal TS based on the detecting result. In other words, in one embodiment, the detecting signal TS indicates the type (or the number of ports) of the first input signal S1. For example, the detecting signal TS indicates that the signal the first input signal S1 is a 4-port signal or an 8-port signal.

The processing circuit 105 is electrically connected to the output terminals ON1-ON3 of the port analyzing circuits 101-103 and the detecting circuit 104. The processing circuit 105 obtains (or captures) port information included in each of the pieces of first data outputted by the output terminals of at least part of the port analyzing circuits 101-103 according to the detecting signal TS for outputting a first control signal CN1. More specifically, the processing circuit 105 choose to capture the port information of each of the pieces of first data outputted by a part of the port analyzing circuits 101-103 or to capture the port information of each of the pieces of first data outputted by all of the port analyzing circuits 101-103 as the first control signal CN1 according to the detecting signal TS which indicates the type (or the number of ports) of the first input signal S1.

For example, if the detecting signal TS indicates the first input signal S1 is an 8-port signal, then it is means that a SATA interface is connected to a PCH. In this case, the processing circuit 105 obtains the port information of each of the pieces of first data (the pieces of first data D1, D2) outputted by the output terminals (e.g. the output terminals ON1, ON2) of a part of the port analyzing circuits (e.g. the port analyzing circuits 101, 102) as the first control signal CN1. If the detecting signal TS indicates the first input signal S1 is a 4-port signal, then it is means that the SATA interface is connected to a HBA. In this case, the processing circuit 105 obtains the port information of each of the pieces of first data (e.g. the pieces of first data D1-D3) outputted by the output terminals (e.g. the output terminals ON1-ON3) of all of the port analyzing circuits (e.g. the port analyzing circuits 101-103) as the first control signal CN1.

The I²C analyzing circuit 11 is configured to analyze a data flow for generating an address message, a control instruction and a piece of input data. The I²C analyzing circuit 11 further outputs a second control signal CN2 according to an address command associated with the address message, the control instruction and the piece of input data. In practice, the I²C analyzing circuit 11 is connected to one or more processors and receives one or more data flows (e.g. data flows C1, C2) from the one or more processors. In the embodiment of FIG. 1, the I²C analyzing circuit 11 obtains an address message, a control instruction and a piece of input data corresponding to a data flow C1, as well as an address message, a control instruction and a piece of input data corresponding to a data flow C2 by respectively analyzing the data flows C1, C2 and further outputs the second control signal CN2 according to address commands associated with the address messages, the control instructions and the pieces of input data corresponding to the data flows C1, C2.

The first multiplexer 12 is configured to output the first control signal CN1 or the second control signal CN2 according to a testing signal DS. The testing signal DS indicates that the backplane currently supports (or operates with) the SATA or the NVME in order to determine to output the first control signal CN1 or the second control signal CN2. The first control signal CN1 and the second control signal CN2 are respectively for LED lightings of the SATA and the NVM. For example, the SATA correspond to a signal level of "1" while the NVME corresponds to a signal level of "0". When the testing signal DS indicates (or includes) a signal level of "1", the first multiplexer 12 enables a path between (or links) the SGPIO analyzing circuit 10 and the output terminal of the first multiplexer 12 for outputting the first control signal CN1. In contrast, when the testing signal DS indicates (or includes) a signal level of "0", the first multiplexer 12 enables a path between (or links) the I²C analyzing circuit 11 and the output terminal of the first multiplexer 12 for outputting the second control signal CN2.

The number of independent analyzing circuits in a conventional structure can be significantly reduced by using the complex programmable logic device 1 provided in the present disclosure for performing the LED lighting associated with HDDs, so that the purpose of reducing the resource consumption via a simple circuit configuration can be achieved.

Figure 2:
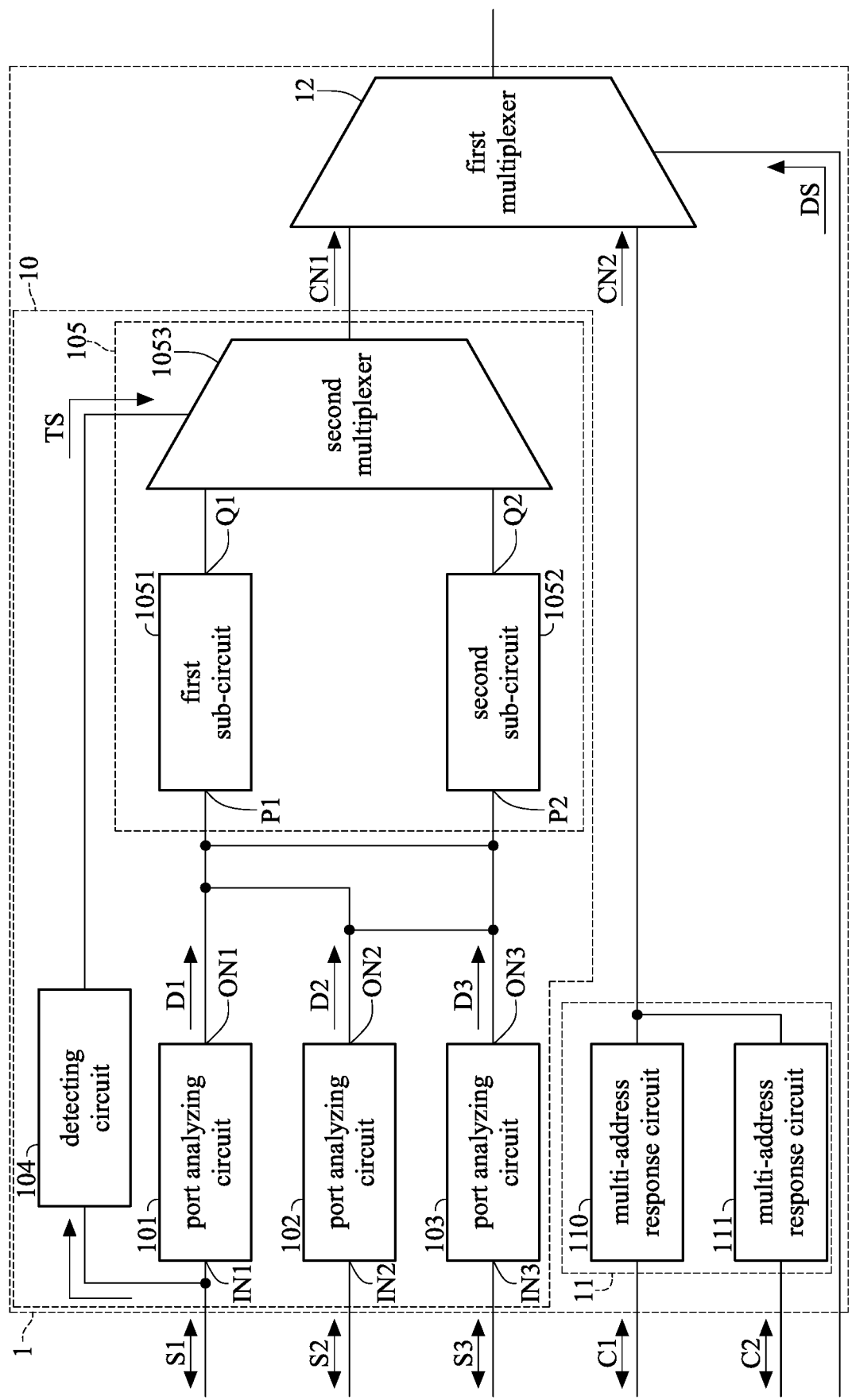
FIG. 2 is a detailed block diagram of the complex programmable logic device according to the embodiment of FIG. 1 of the present disclosure.

Please refer to FIG. 2, which is a detailed block diagram of the complex programmable logic device according to the embodiment of FIG. 1 of the present disclosure. FIG. 1 and FIG. 2 basically have the same structure, but the difference lies in that, in FIG. 2, the processing circuit 105 includes a first sub-circuit 1051, a second sub-circuit 1052 and a second multiplexer 1053, and the I2C analyzing circuit 11 includes two multi-address response circuits 110, 111. The first sub-circuit 1051 has an input terminal P1 and an output terminal Q1. The input terminal P1 of the first sub-circuit 1051 is electrically connected to the output terminals ON1-ON3. The first sub-circuit 1051 is configured to obtain the port information included in each of the pieces of first data outputted by a part of the port analyzing circuits 101-103.

The second sub-circuit 1052 has an input terminal P2 and an output terminal Q2. The input terminal P2 of the second sub-circuit 1052 is electrically connected to the output terminals ON1-ON3. The second sub-circuit 1052 is configured to obtain the port information included in each of the pieces of first data outputted by all of the port analyzing circuits.

The second multiplexer 1053 is electrically connected to the output terminal Q1 of the first sub-circuit 1501, the output terminal Q2 of the second sub-circuit 1502 and the first multiplexer 12. The second multiplexer 1053 enables a path between the output terminal Q1 of the first sub-circuit 1051 and the first multiplexer 12, or a path between the output terminal Q2 of the second sub-circuit 1052 and the first multiplexer 12 according to detecting signal TS.

In practice, in a condition, when the detecting signal TS indicates the first input signal S1 is an 8-port signal, the first sub-circuit 1051 obtains the port information included in each of the pieces of first data D1, D2 outputted by the port analyzing circuits 101-102 as the first control signal CN1. In another condition, when the detecting signal TS indicates the first input signal S1 is a 4-port signal, the second sub-circuit 1052 obtains the port information included in each of the pieces of first data D1-D3 outputted by the port analyzing circuits 101-103 as the first control signal CN1.

In addition, the two multi-address response circuits 110, 111 respectively analyze the data flows C1, C2 for obtaining the address messages, the pieces of input data and the control instructions corresponding to the data flows C1, C2. Specifically, a plurality of predetermined addresses are set up in each of the multi-address response circuits 110, 111. Each of the multi-address response circuits 110, 111 would determine which one of the plurality of predetermined addresses the address message is responsive (or corresponding) to, and further record and output the predetermined address to which the address message is responsive as the address command. Each of the multi-address response circuits 110, 111 outputs a piece of data via a selection using the address command and the control instruction based on the piece of input data. The pieces of data outputted by the multi-address response circuits 110, 111 can serve as the second control signal CN2. By taking the advantage of the feature of the multi-address responses, the number of the I²C slave modules in a conventional structure can be reduced, and accordingly the resource consumption of the complex programmable logic device is significantly decreased.

In one embodiment, the detecting signal TS indicates the first input signal S1 received by the first port analyzing circuit 101 is an 8-port signal. The first sub-circuit 1051 obtains all of values stored in the port information of the piece of first data D1 outputted by the port analyzing circuit 101 and obtains part of values stored in the port information of the piece of first data outputted by a second port analyzing circuit (e.g. the port analyzing circuit 102) according to the detecting signal TS. Specifically, when the first input signal of the first port analyzing circuit 101 is an 8-port signal, the first sub-circuit 1051 would obtain all of the values (e.g. values of eight ports) stored in the port information of the first data D1 outputted by the port analyzing circuit 101. In addition, the first sub-circuit 1051 also obtains a part of the values (e.g. values of four ports among eight ports) stored in the port information of the first data D1 outputted by the port analyzing circuit 102 (that is, the second port analyzing circuit).

In this case, the second sub-circuit 1052 would not obtain the port information of the first data outputted by any port analyzing circuit while the first sub-circuit 1051 outputs the obtained values. The second multiplexer 1053 enables a path between (or links) the first sub-circuit 1051 and the output terminal of the second multiplexer 1053 according to the detecting signal TS so as to output the obtained values as the first control signal CN1.

In another embodiment, the detecting signal TS indicates the first input signal S1 received by the first port analyzing circuit 101 is a 4-port signal. The second sub-circuit 1052 obtains a part of values stored in the port information included in each of the pieces of first data outputted by all of the port analyzing circuits according to the detecting signal TS. Specifically, when the first input signal S1 of the first port analyzing circuit 101 is a 4-port signal, the second sub-circuit 1052 would obtain a part of values stored in the port information included in each of the pieces of first data D1-D3 outputted by all of the port analyzing circuits 101-103. For example, the second sub-circuit 1052 obtains values of four ports among eight ports stored in the port information included in each of the pieces of first data D1-D3 outputted by all of the port analyzing circuits 101-103. That is, the values of the four ports among the eight ports are obtained from the port information included in the piece of first data outputted by each of the port analyzing circuits.

In this case, the first sub-circuit 1051 would not obtain the port information of the first data outputted by the any port analyzing circuit while the second sub-circuit 1052 outputs the obtained values. The second multiplexer 1053 enables a path between (or links) the second sub-circuit 1052 and the output terminal of the second multiplexer 1053 according to the detecting signal TS so as to output the obtained values as the first control signal CN1.

Figure 3:
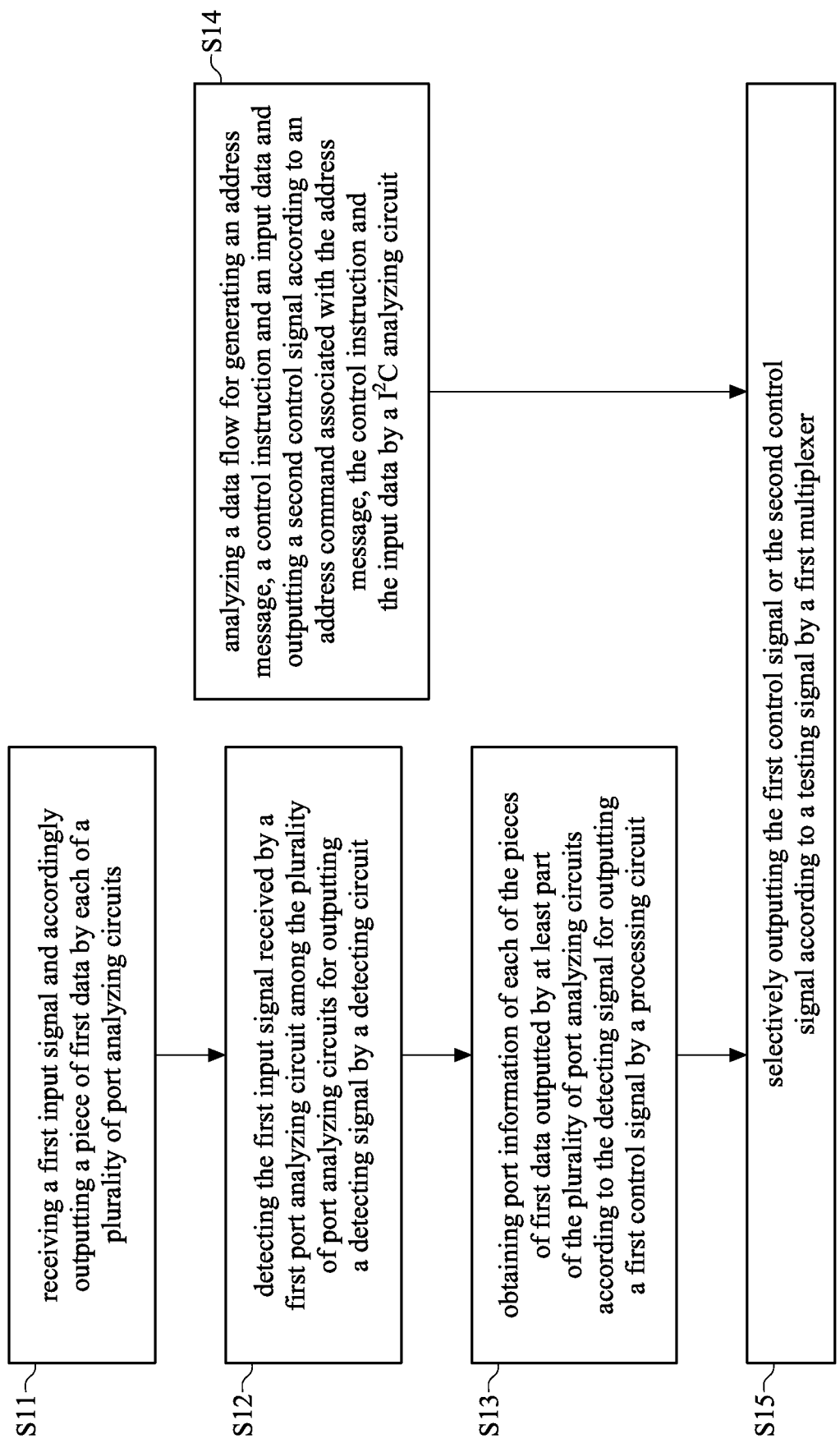
FIG. 3 is a flow chart of an operation method of a complex programmable logic device according to one embodiment of the present disclosure.

Please refer to FIG. 3, which is a flow chart of an operation method of a complex programmable logic device according to one embodiment of the present disclosure. The operation method shown in FIG. 3 is adapted to the complex programmable logic device 1 shown in FIG. 1 and FIG. 2. As shown in figures, in step S11, receiving the first input signals S1-S3 and accordingly outputting the pieces of first data D1-D3 by the port analyzing circuits 101-103 respectively. In step S12, detecting the first input signal S1 received by the first port analyzing circuit 101 among the port analyzing circuits 101-103 for outputting the detecting signal TS. In step S13, by the processing circuit 105 according to the detecting signal TS obtaining port information of each of the pieces of first data outputting by at least part of the port analyzing circuits 101-103 for outputting the first control signal CN1. In step S14, analyzing a data flow (e.g. the data flow C1 or C2) for generating an address message, a control instruction and an input data and outputting the second control signal (e.g. the second control signal CN2) according to an address command associated with the address message, the control instruction and the input data by the I²C analyzing circuit. In step S15, selectively outputting the first control signal CN1 or the second control signal CN2 according to the testing signal DS by the first multiplexer 12.

In one embodiment, when the detecting signal TS indicates the first input signal S1 received by the first port analyzing circuit 101 is an 8-port signal, obtaining the port information of each of the pieces of first data outputted by at least part of the port analyzing circuits according to the detecting signal TS by the processing circuit 105 includes: obtaining all of values stored in the port information of the piece of first data D1 outputted by the first port analyzing circuit 101, and obtaining part of values stored in the port information of the piece of first data (e.g. the piece of first data D2) outputted by a second port analyzing circuit (e.g.

the port analyzing circuit 102) according to the detecting signal TS by a first sub-circuit 1051 included in the processing circuit 105.

In one embodiment, when the detecting signal TS indicates the first input signal S1 received by the first port analyzing circuit 101 is a 4-port signal, obtaining the port information of each of the pieces of first data outputted by at least part of the port analyzing circuits according to the detecting signal TS by the processing circuit 105 includes: obtaining part of values stored in the port information of each of the pieces of first data D1-D3 outputted by all of the port analyzing circuits 101-103 according to the detecting signal TS by the second sub-circuit 1052 included in the processing circuit 105.

In view of the above description, the complex programmable logic device and the operation method thereof provided by the present disclosure, the detecting circuit included in the SGPIO analyzing circuit determines the signal type of the first input signal (e.g. 4-port signal or 8-port signal) received by the first port analyzing circuit, and the processing circuit obtains the port information of at least part of port analyzing circuits according to the signal type for outputting the first control signal. In addition, the second control signal is outputted by using the feature of multi-address responses of the I²C analyzing circuit. With the help of the analysis functions given by both of the SGPIO and I²C circuits, all functions of a variety of types of HDD backplanes can be implemented in the case in which the circuit configuration include in the complex programmable logic device is simplified, so that the purpose of the function integration for the complex programmable logic device is achieved and accordingly the resource consumption and cost are reduced.

What is claimed is:

1. A complex programmable logic device, comprising:
   a SGPIO analyzing circuit comprising:
   a plurality of port analyzing circuits, with each of the plurality of port analyzing circuits having an input terminal and an output terminal, the input terminal configured to receive a first input signal and the output terminal configured to output a piece of first data;
   a detecting circuit electrically connected to the input terminal of a first port analyzing circuit among the plurality of port analyzing circuits and detecting the first input signal received by the first port analyzing circuit for outputting a detecting signal; and
   a processing circuit electrically connected to the plurality of output terminals of the plurality of port analyzing circuits and the detecting circuit, the processing circuit obtaining port information included in each of the pieces of first data outputted by the output terminals of at least part of the plurality of port analyzing circuits according to the detecting signal for outputting a first control signal;
   a I²C analyzing circuit configured to analyze a data flow for generating an address message, a control instruction and an input data, with the I²C analyzing circuit outputting a second control signal according to an address command associated with the address message, the control instruction and the input data; and
   a first multiplexer configured to selectively output the first control signal or the second control signal according to a test signal.

2. The complex programmable logic device according to claim 1, wherein the processing circuit comprises:
   a first sub-circuit having an input terminal and an output terminal, with the input terminal of the first sub-circuit electrically connected to the plurality of output terminals of the plurality of port analyzing circuits, and the first sub-circuit configured to obtain the port information included in each of the pieces of first data outputted by the output terminals of part of the plurality of port analyzing circuits;
   a second sub-circuit having an input terminal and an output terminal, with the input terminal of the second sub-circuit electrically connected to the plurality of output terminals of the plurality of port analyzing circuits, and the second sub-circuit configured to obtain the port information included in each of the pieces of first data outputted by the output terminals of all of the plurality of port analyzing circuits; and
   a second multiplexer electrically connected to the output terminal of the first sub-circuit, the output terminal of the second sub-circuit and the first multiplexer, with the second multiplexer enabling a path between the output terminal of the first sub-circuit and the first multiplexer, or a path between the output terminal of the second sub-circuit and the first multiplexer, according to the detecting signal.

3. The complex programmable logic device according to claim 2, wherein the detecting signal indicates whether the first input signal, received by the first port analyzing circuit, is a four-port signal or an eight-port signal.

4. The complex programmable logic device according to claim 2, wherein the detecting signal indicates the first input signal received by the first port analyzing circuit is an eight-port signal, the first sub-circuit obtaining all of values stored in the port information included in the piece of first data outputted by the first port analyzing circuit and obtaining part of values stored in the port information included in the piece of first data outputted by a second port analyzing circuit among the plurality of port analyzing circuits according to the detecting signal.

5. The complex programmable logic device according to claim 2, wherein the detecting signal indicates the first input signal received by the first port analyzing circuit is a four-port signal, the second sub-circuit obtaining part of values stored in the port information included in each of the pieces of first data outputted by all of the plurality of port analyzing circuits according to the detecting signal.

6. An operation method of a complex programmable logic device, comprising:
   receiving a first input signal and accordingly outputting a piece of first data by each of a plurality of port analyzing circuits;
   detecting the first input signal received by a first port analyzing circuit among the plurality of port analyzing circuits for outputting a detecting signal by a detecting circuit;
   obtaining port information of each of the pieces of first data outputted by at least part of the plurality of port analyzing circuits according to the detecting signal for outputting a first control signal by a processing circuit;
   analyzing a data flow for generating an address message, a control instruction and an input data and outputting a second control signal according to an address command associated with the address message, the control instruction and the input data by a I²C analyzing circuit; and
   selectively outputting the first control signal or the second control signal according to a testing signal by a first multiplexer.

7. The operation method of the complex programmable logic device according to claim 6, wherein when the detecting signal indicates the first input signal received by the first port analyzing circuit is an eight-port signal, obtaining the port information of each of the pieces of first data outputted by the at least part of the plurality of port analyzing circuits according to the detecting circuit by the processing circuit comprises:

obtaining all of values stored in the port information of the piece of first data outputted by the first port analyzing circuit and obtaining part of values stored in the port information of the piece of first data outputted by a second port analyzing circuit among the plurality of port analyzing circuits according to the detecting signal by a first sub-circuit included in the processing circuit.

8. The operation method of the complex programmable logic device according to claim 6, wherein when the detecting signal indicates the first input signal received by the first port analyzing circuit is a four-port signal, obtaining the port information of each of the pieces of first data outputted by the at least part of the plurality of port analyzing circuits according to the detecting circuit by the processing circuit comprises:

obtaining part of values stored in the port information of each of the piece of first data outputted by all of plurality of port analyzing circuits according to the detecting signal by a second sub-circuit included in the processing circuit.

\* \* \* \* \*